(12) United States Patent
Heckler et al.

(10) Patent No.: US 8,973,423 B2
(45) Date of Patent: Mar. 10, 2015

(54) MEASURING DEVICE FOR DETERMINING THE FILL QUANTITY OF AN SF6 GAS IN AN ISOLATED CHAMBER OR A SWITCHGEAR, AND CORRESPONDING METHOD

(75) Inventors: Thomas Heckler, Grossheubach (DE); Nicolas Bauer, Sechmauern (DE); Andreas Mueller, Kingenberg (DE)

(73) Assignee: Wika Alexander Wiegand GmbH & Co. KG, Klingenberg (DE)

( * ) Notice: Subject to any disclaimer, the term of this patent is extended or adjusted under 35 U.S.C. 154(b) by 404 days.

(21) Appl. No.: 13/146,067

(22) PCT Filed: Jan. 30, 2009

(86) PCT No.: PCT/EP2009/051086
§ 371 (c)(1),
(2), (4) Date: Oct. 27, 2011

(87) PCT Pub. No.: WO2010/086024
PCT Pub. Date: Aug. 5, 2010

(65) Prior Publication Data
US 2012/0118043 A1 May 17, 2012

(51) Int. Cl.
*G01N 9/00* (2006.01)
*H01H 33/56* (2006.01)
*G01F 22/02* (2006.01)

(52) U.S. Cl.
CPC ............. *H01H 33/563* (2013.01); *G01F 22/02* (2013.01)
USPC ....................................... 73/30.02; 73/32 R

(58) Field of Classification Search
USPC ............................................. 73/32 R, 30.02
See application file for complete search history.

(56) References Cited

U.S. PATENT DOCUMENTS

| 4,262,532 | A | 4/1981 | Butler et al. |
| 5,410,908 | A | 5/1995 | Erichsen |
| 6,367,308 | B1 | 4/2002 | Mermonier |
| 6,651,483 | B1 | 11/2003 | Meyer et al. |
| 7,257,496 | B2 | 8/2007 | Rhodes et al. |

(Continued)

FOREIGN PATENT DOCUMENTS

| CN | 2531383 | 1/2003 | |
| DE | 34 28 322 A1 | 2/1986 | |
| DE | 3505809 A1 * | 8/1986 | ............... G01L 7/04 |

(Continued)

OTHER PUBLICATIONS

English machine translation of DE 20011018 Description. Accessed on Jun. 30, 2014 at <http://worldwide.espacenet.com/advancedSearch?locale=en_EP>.*

(Continued)

*Primary Examiner* — Lisa Caputo
*Assistant Examiner* — Punam Roy
(74) *Attorney, Agent, or Firm* — Baker & Hostetler LLP

(57) ABSTRACT

A measuring device according to the invention for determining the fill quantity of $SF_6$ gas in an insulating chamber comprises a pressure transducer, a temperature measuring element and a processing device for determining the fill quantity of the $SF_6$ gas from the pressure measurement value and the pertinent temperature measurement value, wherein the measuring device seals a corresponding opening of the insulating chamber and the $SF_6$ gas to be measured acts directly upon both the pressure transducer and the temperature measuring element.

7 Claims, 6 Drawing Sheets

(56) References Cited

U.S. PATENT DOCUMENTS

2006/0025955 A1    2/2006    Kurtz et al.
2007/0027640 A1    2/2007    Rhodes et al.

FOREIGN PATENT DOCUMENTS

| | | |
|---|---|---|
| DE | 20011018 U1 | 9/2000 |
| EP | 0 637 114 A1 | 2/1995 |
| JP | 11111122 A * 4/1999 | ............. H01H 33/56 |

OTHER PUBLICATIONS

Mears et al., "Physical Properties and Virial Coefficients of Sulfur Hexafluoride", Journal of Physical Chemistry, American Chemical Society, US, vol. 73, No. 7, Jul. 1, 1969.

Google Machine Translation of Abstract of DE20011018U1.

* cited by examiner

оссand corresponding method

CROSS-REFERENCE TO RELATED APPLICATIONS

This application is a National Stage of International Patent Application No. PCT/EP2009/051086, filed on Jan. 30, 2009, the disclosure of which is incorporated herein by reference in its entirety.

FIELD OF THE INVENTION

The present invention relates to a measuring device for determining the fill quantity of $SF_6$ gas in an insulating chamber or a switch gear, a method of determining the fill quantity of the $SF_6$ gas in the insulating chamber or switch gear and to a system for monitoring the fill quantity of the $SF_6$ gas in the insulating chamber or switch gear.

STATE OF THE ART

In U.S. Pat. No. 7,257,496 B2 a method of monitoring $SF_6$ gas in a high-voltage tank is described. A pressure of the $SF_6$ gas provided in the tank, an ambient temperature of the tank and a temperature of the tank skin are measured at different measuring times. After that an average value is calculated from the measured temperatures and is approximately determined as $SF_6$ gas temperature in the tank. From a number of moles of the $SF_6$ gas that is calculated from the $SF_6$ gas pressure measured and the gas temperature calculated with the aid of the ideal gas equation ($p*V=n*R*T$) a molar ratio is determined from the resulting linear value development at the different measuring times. After 21 days of measurement a trend of the molar ratio is recorded and the gradient of the trend is compared to a maximally admissible leakage. With the help of the trend the point in time is calculated at which it falls below a deposited limit value. In this method the measuring data are transmitted to an operator in charge who is at a distance from the high voltage tank.

It is a problem of the known state of the art that the ambient and surface temperature or the average value of the surface and ambient temperatures of the $SF_6$ gas tank are not equal to the actual gas temperature. Moreover, $SF_6$ gas has a non-linear behavior as it is known from a typical $SF_6$ gas pressure temperature characteristic. This means that by applying the ideal gas equation for determining a number of moles of the $SF_6$ gas merely approximate values are obtained compared to applying a real gas approach in which actually measured values are applied. In addition, the number of moles depends on the accuracy of the first measurement, i.e. the reference measurement which is obtained only approximately accurately when applying the ideal gas equation. Minimum leakages therefore cannot be detected by the method described in this state of the art.

It is another problem of the known state of the art that a measurement for 21 days usually is not sufficient to make a correct statement about the behavior of the monitored tank, as the leakage rates to be expected cause no significant changes of the fill quantity even after one year (a benchmark of the change of fill quantity is maximally ~0.5%/year). The same applies to the calculation of the point in time to be expected of falling below the deposited limit value. Finally, it is another problem that a failure of data transmission to the operator in charge results in a failure of the entire monitoring.

SUMMARY OF THE INVENTION

Therefore, the object underlying the invention is to solve the afore-mentioned problems of the state of the art.

The measuring device according to the invention for determining the fill quantity of $SF_6$ gas in an insulating chamber comprises a pressure transducer, a temperature measuring element and a processing device for determining the fill quantity of the gas from the pressure measurement value measured by the pressure transducer and the pertinent temperature measurement value measured by the temperature measuring element. The measuring device is arranged so that the $SF_6$ gas to be measured is allowed to penetrate the measuring device. In this way it is achieved that the gas to be measured acts directly upon both the pressure transducer and the temperature measuring element.

The temperature measuring element preferably is a temperature sensor which is glazed in the measuring device in a gas-tight manner. This means that the electric connection to the temperature sensor is guided out of the chamber (gas chamber or tank) to which $SF_6$ gas is applied in the measuring device by glazing. The temperature sensor preferably is a PT100 sensor and the insulating chamber preferably is a high-voltage switch gear filled with $SF_6$ insulating gas.

Moreover the pressure transducer as pressure absorbing element preferably includes a membrane to which the $SF_6$ gas is directly applied, wherein the pressure of the $SF_6$ gas is transmitted via the membrane to further components of the pressure transducer. As an alternative to this, the pressure transducer can be a strain gauge inserted in the membrane, a piezo pressure sensor etc.

In the measuring device the temperature measuring element is preferably arranged so that it is disposed upstream of the membrane of the pressure transducer in a direction toward the insulating chamber. That means that the measuring point at which the temperature measurement of the $SF_6$ gas takes place is located directly ahead of the measuring point of the pressure measurement of the $SF_6$ gas with respect to the insulating chamber in the measuring device. In this way it can be ensured that the measured temperature of the $SF_6$ gas corresponds to the measured pressure of the $SF_6$ gas.

Furthermore, the measuring device is preferably surrounded by a thermally insulating sheath so that the measuring elements disposed in the measuring device are thermally insulated to the outside toward an ambience. Thus falsification of the measuring data, especially falsification of the temperature measuring data can be prevented.

The processing device is preferably disposed in the measuring device such that it is arranged downstream of the pressure transducer and the temperature measuring element in the direction of the insulating chamber. That means that the processing device is arranged in the measuring device behind the temperature measuring element and the pressure transducer with respect to the insulating chamber. The temperature element and the pressure transducer transmit their measuring signals to the processing device which processes said signals and outputs a signal corresponding to the fill quantity. Further preferably the processing device, the pressure transducer and the temperature measuring element are disposed substantially coaxially in the measuring device so that respective central axes of the processing device, of the pressure transducer and of the temperature measuring element substantially coincide. In this manner, mounting of these components into the measuring device prior to arranging the measuring device at the insulating chamber can be facilitated and a spatial vicinity as well as a correct relative position of the individual components can be ensured, whereby, inter alia, falsification of the measuring data due to undesired contact, long transmission distances and other mutual influence is avoided.

The measuring device according to the invention preferably outputs, in addition to the signal corresponding to the fill quantity, a signal corresponding to the gas temperature measured. Said gas temperature signal can be used to smooth a course of the fill quantity signal over the time and to compensate for an error of the signal corresponding to the fill quantity caused by a temperature-related volume expansion of the insulating chamber. The signals output by the measuring device preferably are analogous signals corresponding to the 4-20 mA standard.

The measuring device according to the invention permits to identify already minimal leakage of the insulating chamber and to initiate appropriate counter-measures. On principle, the measuring device according to the invention thus consists of a combined pressure and temperature sensor that provides an analogous output signal proportional to the fill quantity. The fill quantity signal is established substantially from a density of the $SF_6$ gas which is calculated based on a measured $SF_6$ gas pressure signal and a measured $SF_6$ gas temperature signal and is subsequently further compensated with the aid of the gas temperature measured. When identifying the $SF_6$ gas density, preferably a virial real gas approach in accordance with a virial equation is applied and the calculation is made internally in the processing device of the measuring device. A virial equation is an extension of the general gas equation by series expansion according to powers of $1/V_m$. When stopping the series expansion after the first member, in turn the general gas equation is obtained. If the series expansion is continued, however, a potentially infinite number of state equations having an increasing number of parameters are formed. In contrast to other approaches such as, e.g., the ideal gas equation, the virial real gas approach is adapted to imitate the non-linear behavior (pressure-temperature characteristic) of $SF_6$ gas sufficiently exactly.

The virial real gas approach is based on the general (ideal) gas equation ($p*V=n*R*T$), wherein a real gas factor Z is integrated. Usually the real gas factor Z is not considered to be a fixed constant, however, but is regarded as a function of temperature, for instance (Z(T)). Upon varying temperature other values are resulting for Z. An analogous procedure can be applied to the parameters of density or pressure and the real gas factor can be made dependent on the latter.

$$p=\rho*R_{SF6}*T*Z(T) \tag{1}$$

The real gas factor includes at least one variable provided with an exponent to depict a curve function corresponding to the real behavior of the $SF_6$ gas. The real gas factor is composed of plural individual terms dependent on the temperature and increasing powers of the density.

$$p=\rho*R_{SF6}*T*\{1+B(T)*\rho+C(T)*\rho^2\} \tag{2}$$

It has to be noted in equation (2) that the density must be converted so that it is given in the unit $mol/L^{15}$. In order to obtain the result of calculation in specie it is necessary to insert the general gas constant in the form of $$R=0.0831434\ J/(mol*K)$$

into equation (2). Each of the two terms B(T) and C(T) in equation (2) is composed of plural terms:

$$B(T)=B_0+(B_1/T)+(B_3/T^3)+(B_5/T^5) \tag{3}$$

$$C(T)=C_0+C_1*T+C_2*T^2 \tag{4}$$

The measurement of the $SF_6$ gas temperature appropriately takes place in a measuring chamber integrated in the measuring device in which the temperature measuring element and the pressure transducer are also arranged and which has a direct connection to the gas chamber of the insulating chamber to be monitored. The direct connection to the gas chamber or tank therefore ensures a gas exchange which enables the temperature measuring element to measure the actual gas temperature. The measuring chamber is hermetically sealed against the residual measuring device and is insulated against thermal failure influences from outside by the thermally insulating sheath.

The analogous measuring elements of the measuring device according to the invention are preferably directly connected to a programmable logic control (PLC). In the PLC the local alarms for monitoring safe operation of the switch gear are realized. If a sudden leakage occurs, the PLC outputs a respective alarm when it falls below a set limit value, whereby safe operation of the switch gear can be guaranteed. In addition, the analogous signals in the PLC are preferably digitalized in connection to the measuring device (at least 14 bit A/D conversion). The PLC further preferably can be connected to a local display. The current density value is shown on the display. The display may include a color change function (e.g.: green figures=OK, yellow figures=limit value reached, red figures=$2^{nd}$ limit value reached). By placing the PLC in a direct environment of the monitored switch gear, i.e. without remote data transmission, and by the fact that the alarm outputs of the PLC are directly connected to the control of the switch gear, safe operation of the switch gear is guaranteed at any time.

The signals digitalized in this way are preferably sent to a central data base by means of remote data transmission technology. A specific evaluating software which has access to the central data base offers the opportunity to store previously established characteristics of the measuring elements and to correct disturbing external influences (e.g. volume expansion of the gas chamber or tank). The volume expansion is corrected by means of the measured temperature and a deposited expansion coefficient of the tank material. The corrected density values are permanently stored in the data base for the purpose of analysis. The raw data are archived. Furthermore, the software can estimate a trend of the monitored fill quantity from the measuring data in the course of a statistic evaluation (method of smallest squares of error, Best Fit Straight Line). The result of evaluation is the actual leakage, i.e. the actual $SF_6$ gas loss of the switch gear to be monitored. The found linear trend can be stored in the data base and can be converted, as desired by the user, e.g. into a leakage rate or into already emitted gas mass. To this end, merely data relating to the size (volume) and the desired density of the monitored tank have to be deposited in the evaluating software. The trend can be determined, especially at the beginning of measurement, even over shorter periods of time. Since the emission data in general relate to a period of one year, however, evaluations over shorter periods of time can be used for statements on the leakage situation of the tank to a limited extent only.

The analysis of the fill quantity via the $SF_6$ gas density is carried out in fixed periods, e.g. over one year, one quarter or one month.

The evaluation over one year provides the most accurate results, the evaluations over shorter periods of time show short-term variations of the leakage. The evaluating software outputs a corresponding trend of the tank leakage. In contrast to classical $SF_6$ gas monitoring methods, a user can plan the maintenance of the switch gear, for instance re-filling the $SF_6$ gas, in advance with the aid of the leakage trend. The evaluating software further offers the possibility of defining limit values for the tank leakage. If the set limit values are exceeded or fallen below, the user is accordingly informed and can take counter-measures, for instance to seal the leakage.

In the measuring device according to the invention all measuring values are transmitted to the data base and deposited or stored in the same. According to said measuring values, for instance a graphical evaluation can be prepared which provides the user with the required information. It is imaginable in this context that the user's access to the data base can be performed from each PC having Internet access, wherein the user is provided, for instance, with a password protected access. Alternatively, at regular intervals reports containing the respective information about the gas loss of the system can be made available to the user. The measuring device according to the invention offers the possibility of planning the maintenance of the switch gear in advance as well as of determining an increased leakage and of initiating counter-measures.

The method according to the invention for determining the fill quantity of the SF6 gas in the insulating chamber comprises a step of measuring the pressure of the gas by the pressure transducer, a step of measuring the temperature of the gas immediately by the temperature measuring element, a step of determining the density of the gas from the gas pressure measurement value and the pertinent gas temperature measurement value, a step of outputting a signal corresponding to the gas density, a step of outputting a pertinent signal corresponding to the gas temperature and a step of establishing a trend concerning the leakage of the insulating chamber. The method further preferably comprises an additional step in which the error of the signal corresponding to the fill quantity cause by temperature-related volume expansion of the insulating chamber is compensated making use of the pertinent gas temperature signal. Furthermore in the step of determining the gas density preferably a virial real gas approach is taken into account.

The system according to the invention for monitoring the fill quantity of the $SF_6$ gas in the insulating chamber in which high-voltage components are contained comprises the measuring device according to the invention as described in the foregoing as well as an evaluating unit for recording the signal corresponding to the fill quantity over the time. The afore-described method according to the invention is employed in this context in order to determine a trend concerning the leakage of the insulating chamber. Preferably the signals are transmitted to the evaluating unit by appropriate remote data transmission technologies, such as by radio technology or via Internet.

BRIEF DESCRIPTION OF THE FIGURES

Hereinafter the invention will be illustrated by way of a preferred embodiment with reference to the Figures, in which.

DETAILED DESCRIPTION OF THE INVENTION

Figure 1:
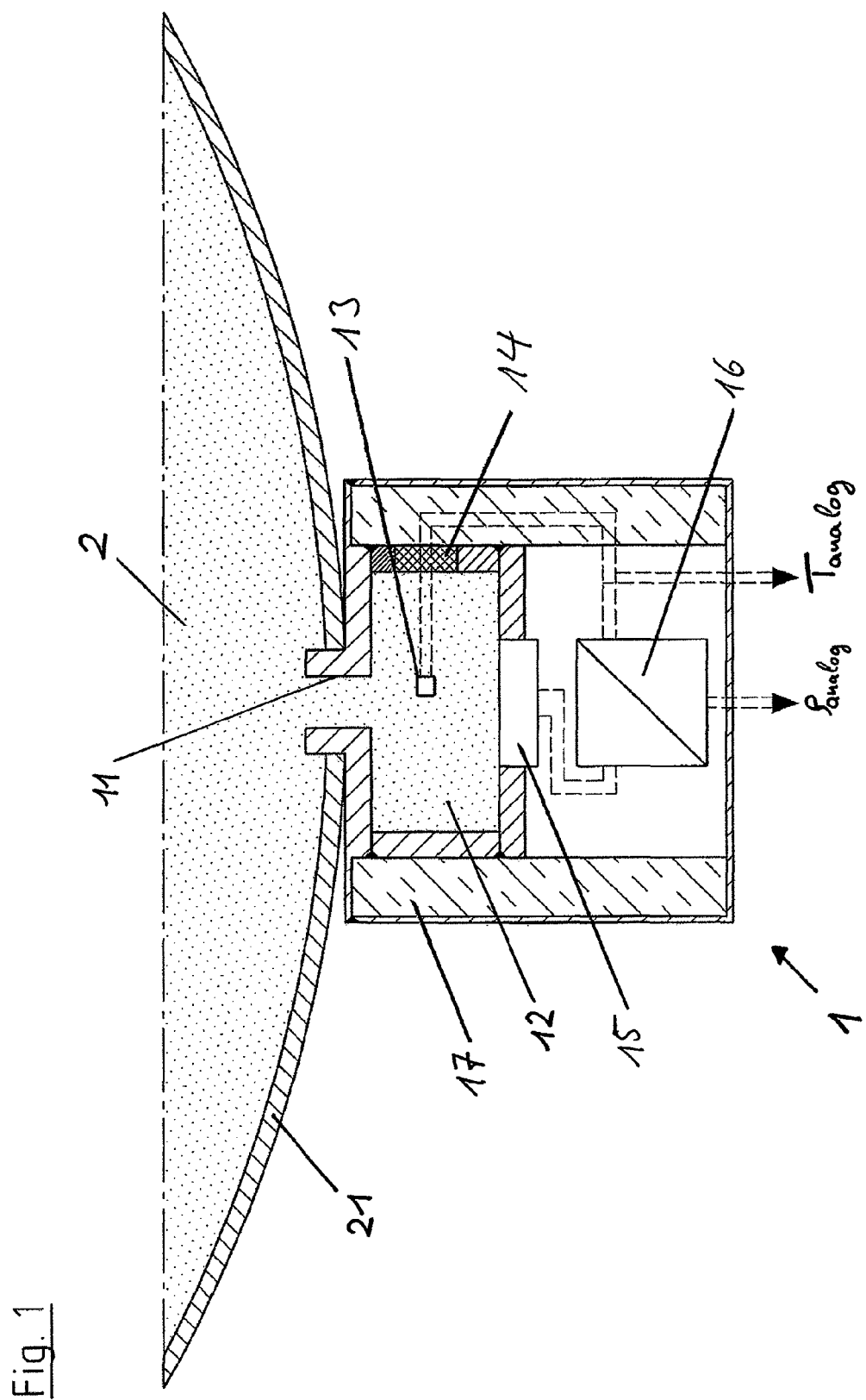
FIG. 1 shows a sectional view of a measuring means according to the invention in the state connected to an insulating chamber according to the preferred embodiment.

FIG. 1 shows a measuring device 1 according to the preferred embodiment of the invention. The measuring device 1 is mounted to an opening in an external wall 21 of an insulating chamber 2, whereby the opening in the external wall 21 is closed in a gas-tight (hermetical) manner. The insulating chamber 2 is filled with $SF_6$ gas. The measuring device 1 is connected to the external wall 21 via a thread (not shown) in this case. As an alternative, the measuring device 21 can be welded to the external wall 21 or pressed into the opening in the external wall 21.

Through an opening 11 in the measuring device 1 the $SF_6$ gas can penetrate the measuring chamber 12. In the measuring chamber 12 a temperature measuring element 13 for measuring the temperature of the $SF_6$ gas is provided. The electric wire of the temperature measuring element 13 leads out of the measuring chamber 12, wherein the passage of the wire out of the measuring chamber 12 is sealed by a glazing 14 (i.e. molten in glass).

A pressure transducer 15 is moreover disposed in the measuring chamber 12, wherein the pressure transducer 15 is embedded in a rear wall of the measuring chamber 12. In the preferred embodiment the pressure transducer 15 includes a pressure membrane which is exposed toward the measuring chamber 12. In this way, $SF_6$ gas acts directly upon the membrane and the pressure transducer 15 measures the pressure of the $SF_6$ gas in the measuring chamber 12. In the measuring chamber 12 the temperature measuring element 13 is disposed in direct vicinity ahead of the pressure transducer 15 so that a measured pressure and a measured temperature in the measuring chamber 12 are associated with the same $SF_6$ gas share. The membrane is hermetically sealed with the measuring chamber 12 and seals the same.

The pressure transducer 15 and the temperature measuring element 13 are electrically connected to a processing device 16, wherein the pressure transducer 15 and the temperature measuring element 13 transmit their respective measuring signals to the processing device 16. In the processing device 16 an analogous density signal $\rho_{analog}$ analog of the $SF_6$ gas is established from the analogous pressure signal $\rho_{analog}$ and the corresponding analogous temperature signal $T_{analog}$ and output with the aid of the afore-described virial real gas approach. In addition, the measured, analogous temperature signal $T_{analog}$ is output also directly by the temperature measuring element 13.

The measuring device 1 represents a closed fluid-tight unit in which the temperature measuring element 13, the pressure transducer 15 and the processing device 16 are arranged substantially coaxially with respect to one another such that the temperature measuring element 13 is arranged with respect to the insulating chamber 2 in the measuring chamber 12 upstream of the pressure transducer 15 and the latter is in turn arranged upstream of the processing device 16. This internal arrangement in the measuring device 1 is insulated against outer thermal influences by a thermally insulating sheath 17. The thermally insulating sheath 17 can consist of an insulating material such as thermally insulating plastic foam.

Figure 2:
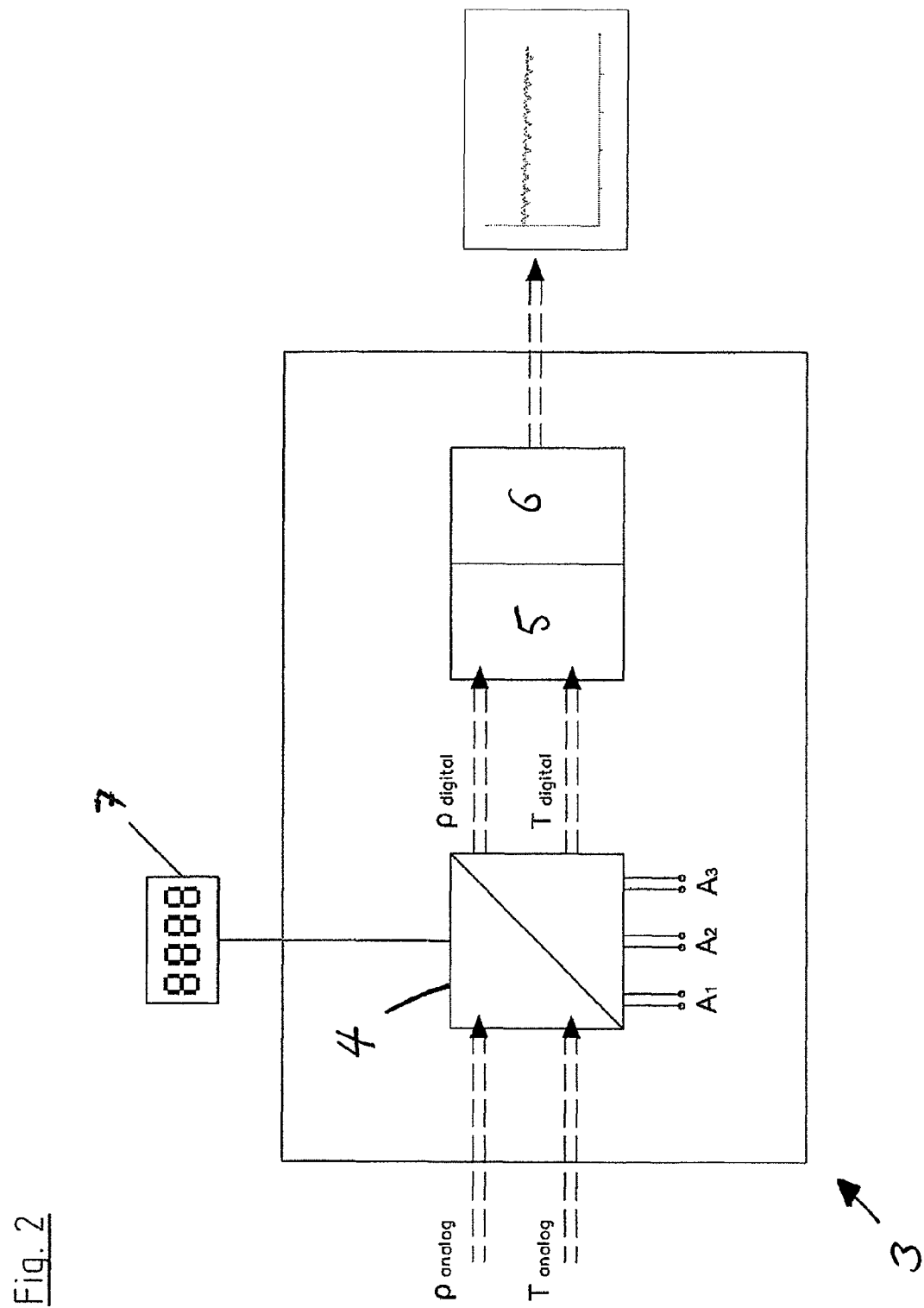
FIG. 2 is an exemplary schematic view of a storage programmable control connected to the measuring device according to the preferred embodiment.

FIG. 2 schematically illustrates a control device 3 arranged downstream of the measuring device 1 which includes a programmable logic control (PLC) and in which the analogous temperature and density signals $\rho_{analog}$, $T_{analog}$ output by the measuring device 1 are used as input signals. In the control device 3 the analogous output signals $\rho_{analog}$, $T_{analog}$ of the measuring device 1 are converted to digital signals $\rho_{digital}$, $T_{digital}$ in an analog-to-digital converter 4. The digital signals $\rho_{digital}$, $T_{digital}$ are intermediately stored in a memory 5 and are further communicated bi-directionally as a data packet via a communication interface 6, e.g. at a server, wherein the further communicated signals finally serve for establishing a trend curve by an evaluating software. The control provides alarm contacts $A_1$, $A_2$, $A_3$ etc. programmable for particular pre-set density values in order to indicate a critical dropping of the $SF_6$ gas density. Moreover, the currently measured fill quantity can be displayed via an additional display 7 as actual value directly at or in the vicinity of the insulating chamber 2.

Figure 3:
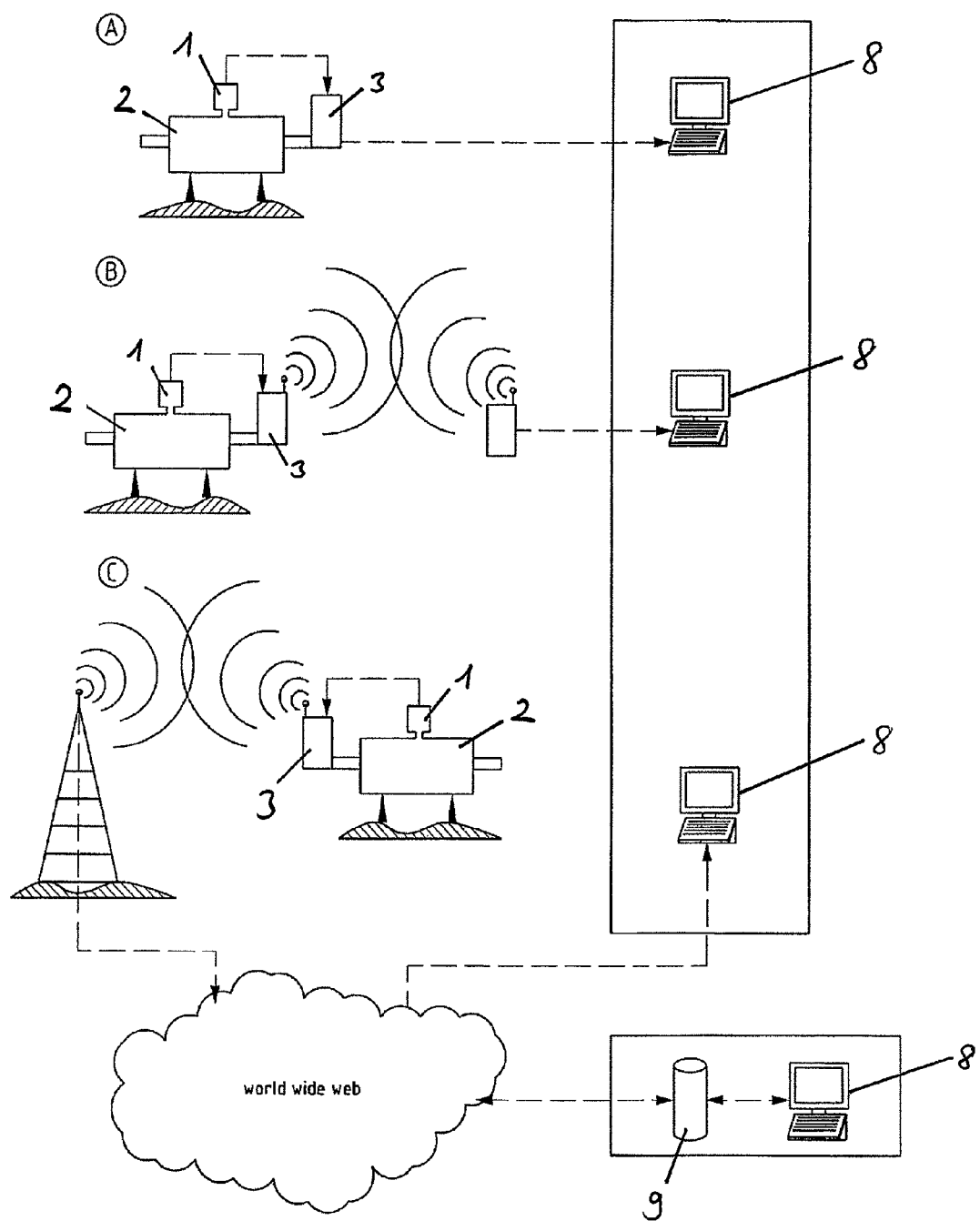
FIG. 3 shows various types of communication possibilities between the measuring device and a user.

FIG. 3 shows different possible types of remote data transmission of the signals measured by the measuring device 1 in the insulating chamber 2 and further processed by the control device 3 to an evaluating means 8 which performs the evaluating software. In the case A of FIG. 3 the information output by the control device 3 are transmitted directly to the evaluating means 8, e.g. via a fixed underground wire. In the case B of FIG. 3 the information output by the control device 3 are transmitted to the evaluating means 8 via radio transmission. In the case C of FIG. 3 the information output by the control device 3 are fed via radio transmission into a computer network, such as Internet (world wide web) and transmitted to the evaluating means 8 via a server 9.

Figure 4:
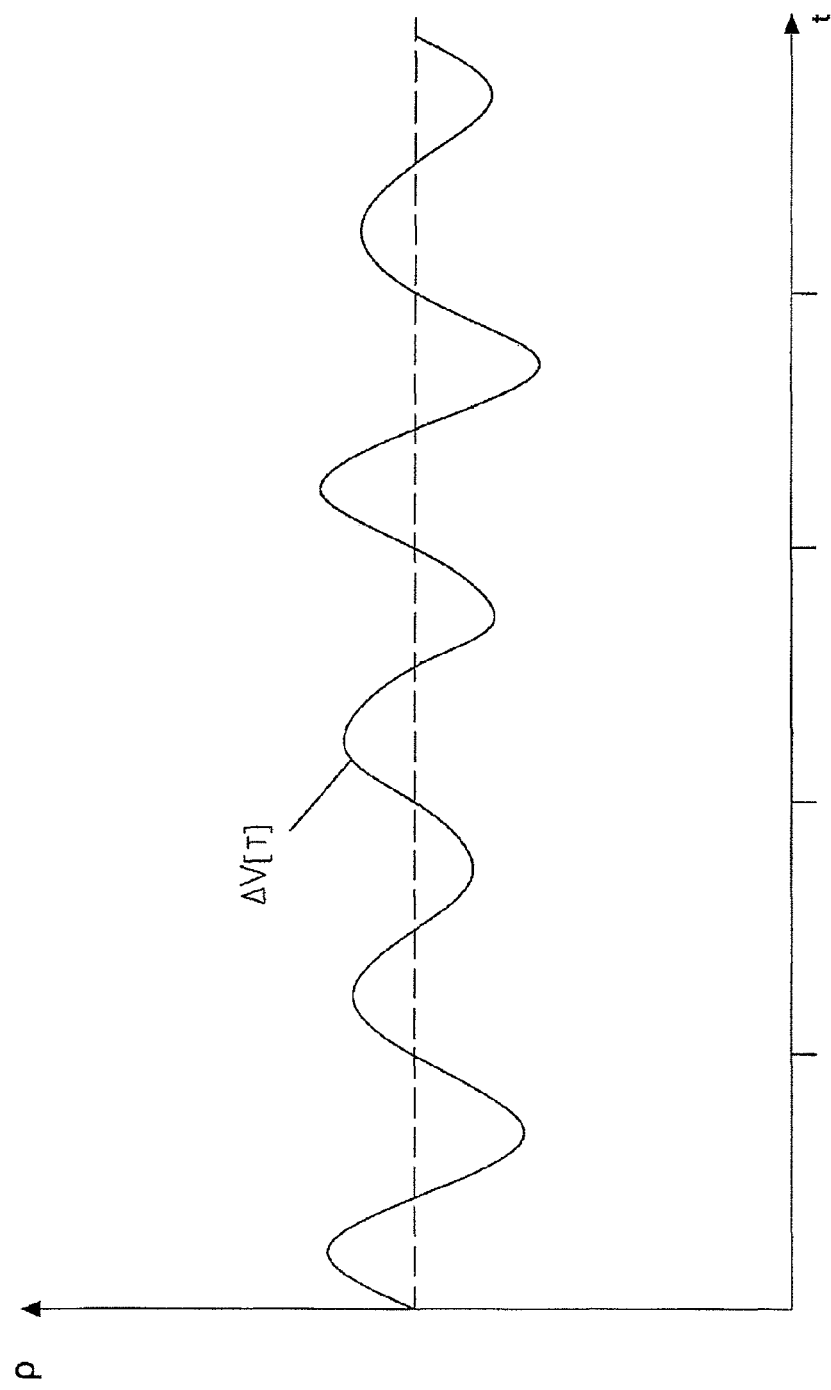
FIG. 4 shows a diagram indicative of a density course of the $SF_6$ gas over the time.

In FIG. 4 a density course of the $SF_6$ gas fill quantity is illustrated over the time t on a diagram. In this view the distance between two lines on the time axis corresponds to one day. Thus it can be recognized how the density $\rho$ varies over the day by heating the insulating chamber 2, for instance. It can be clearly inferred from this diagram that the fill volume V converted to standard values is strongly dependent on a temperature in the insulating chamber 2 and thus from an $SF_6$ gas temperature.

Figure 5:
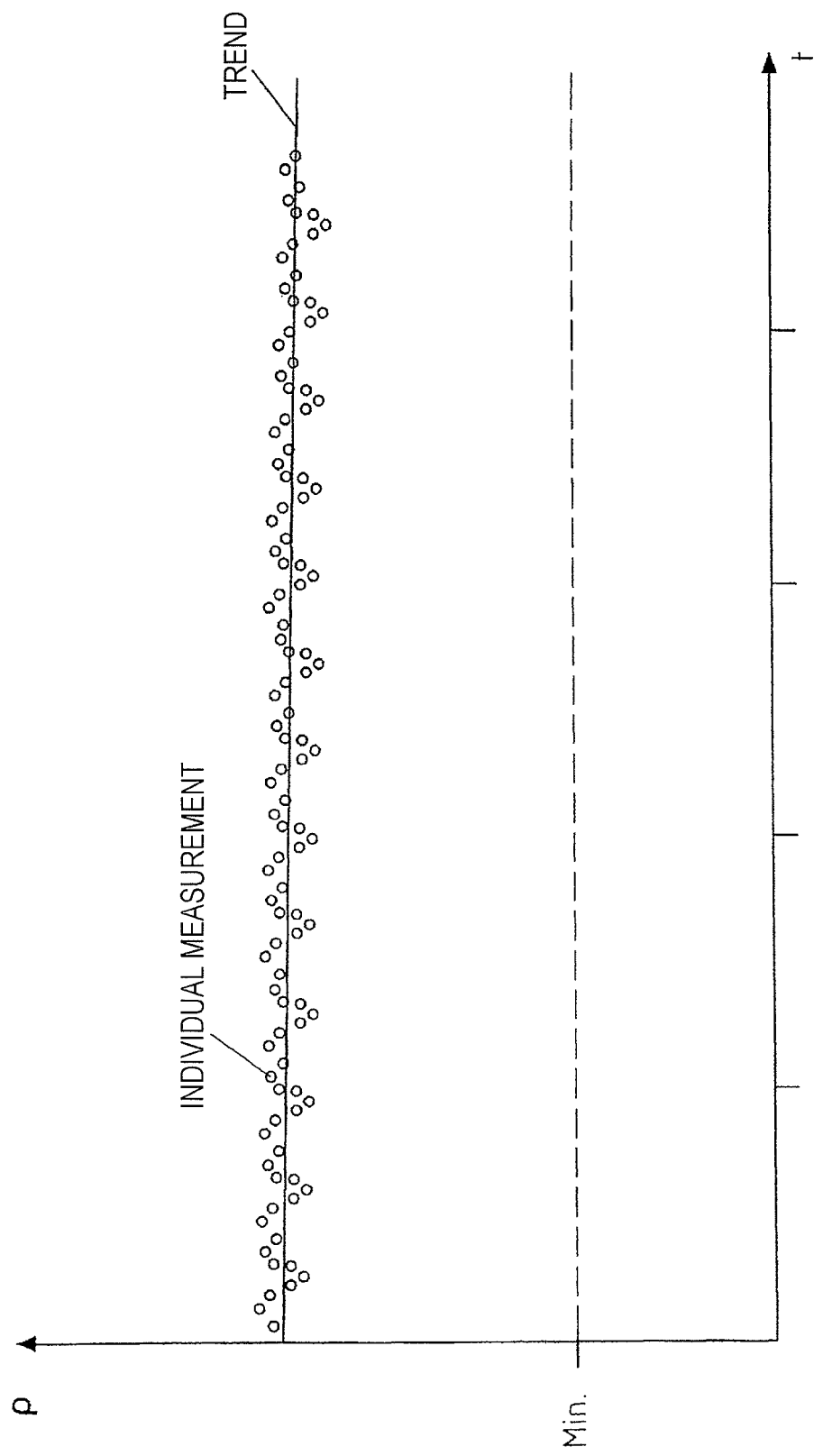
FIG. 5 shows a diagram indicative of an error-compensated density course of the $SF_6$ gas.

FIG. 5 shows a diagram indicative of a temperature compensated course of the $SF_6$ gas density p of the individual measurements over the time t. To this end, the $SF_6$ gas temperature is calculated for each measurement as compensating factor in order to compensate the temperature-related volume expansion of the insulating chamber 2. The trend of the $SF_6$ gas density p is equally shown in the diagram. It can be recognized that the trend line is inclined slightly downward and slowly approaches a minimum limit value Min. Upon reaching the minimum limit value Min., for instance the evaluating means 8 can output an acoustic or visual warning to a user so that counter-measures can be initiated. Moreover, for instance the display 7 can output a visual signal directly in situ in the vicinity of the insulating chamber 2 to a user, such as e.g. maintenance personnel.

Figure 6:
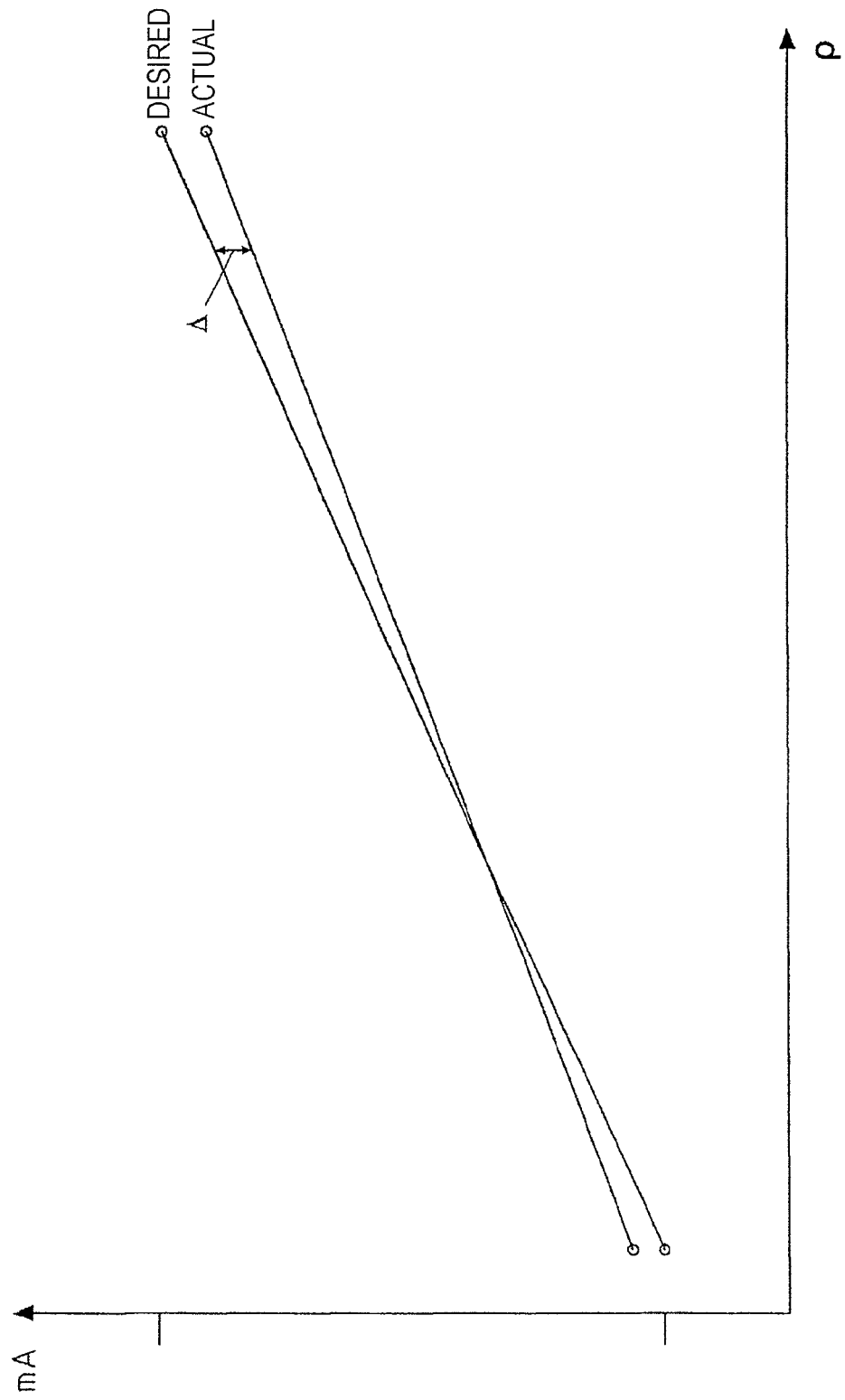
FIG. 6 shows a diagram indicative of a predetermined actual characteristic and the corresponding desired characteristic of the measuring device.

In the diagram of FIG. 6 a predetermined actual characteristic and the corresponding desired characteristic of the measuring device 1 is shown. From these characteristics a signal difference $\Delta$ can be determined by which the actual course of the $SF_6$ gas density $\rho$ has varied compared to the desired course.

The invention claimed is:

1. A measuring device for determining the fill quantity of $SF_6$ gas in an insulating chamber, comprising a pressure transducer, a temperature measuring element and a processing device for determining the fill quantity of the $SF_6$ gas from the pressure measurement value and the pertinent temperature measurement value,
   wherein the measuring device is arranged to seal an opening of the insulating chamber and includes a measuring chamber in which both the pressure transducer and the temperature measuring element are arranged and the $SF_6$ gas to be measured acts directly upon the latter,
   wherein the processing device is arranged in the measuring device downstream of the pressure transducer and the temperature measuring element in the direction of the insulating chamber and outputs a signal corresponding to the gas fill quantity,
   wherein the pressure transducer includes a membrane,
   wherein the temperature measuring element is arranged in the measuring device in the direction of the insulating chamber upstream of the membrane of the pressure transducer.

2. A measuring device according to claim 1, wherein the temperature measuring element is a temperature sensor glazed in the measuring device in a gas-tight manner.

3. A measuring device according to claim 1, wherein the measuring device is surrounded by a thermally insulating sheath.

4. A measuring device according to claim 1, wherein the insulating chamber is a high-voltage switch gear filled with $SF_6$ insulating gas.

5. A measuring device according to claim 1, wherein the processing device, the pressure transducer and the temperature measuring element are arranged substantially coaxially in the measuring device.

6. A measuring device according to claim 1, wherein the measuring device outputs a signal corresponding to the gas temperature in addition to the signal corresponding to the gas fill quantity.

7. A measuring device according to claim 1, wherein the output signals are analogous signals and are output according to the 4-20 mA standard.

* * * * *